United States Patent
Short

(10) Patent No.: US 6,596,356 B1
(45) Date of Patent: Jul. 22, 2003

(54) FUEL PERMEATION BARRIER FUEL TANK

(75) Inventor: William Thomas Short, Southfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 162 days.

(21) Appl. No.: 09/650,589

(22) Filed: Aug. 30, 2000

Related U.S. Application Data
(60) Provisional application No. 60/172,561, filed on Dec. 18, 1999.

(51) Int. Cl.$^7$ .................. B29D 22/00; B29D 23/00; B32B 1/08; B65D 88/12
(52) U.S. Cl. ............ 428/36.7; 428/35.7; 428/35.9; 428/36.6; 428/36.91; 220/562
(58) Field of Search .................. 428/35.7, 35.9, 428/36.6, 36.91, 36.7, 35.2, 421, 422; 220/562, 415, 456, 457; 206/524.1, 524.2, 524.3, 524.5

(56) References Cited

U.S. PATENT DOCUMENTS

| | | | | |
|---|---|---|---|---|
| 5,441,781 A | * | 8/1995 | Uchida et al. | 428/35.7 |
| 6,033,749 A | * | 3/2000 | Hata et al. | 428/36.7 |
| 6,197,393 B1 | * | 3/2001 | Jing et al. | 428/35.9 |

* cited by examiner

*Primary Examiner*—Harold Pyon
*Assistant Examiner*—Michael C. Miggins
(74) *Attorney, Agent, or Firm*—Vincent A. Cichosz

(57) ABSTRACT

A fuel permeation barrier fuel tank for a vehicle includes a tank shell having a wall formed from a plurality of layers. The layers include at least an inner layer, an outer layer and a fuel permeation barrier layer disposed between the inner layer and the outer layer, and a thermoformable layer disposed between the fuel permeation barrier layer and the outer layer to improve permeation resistance of the fuel tank.

17 Claims, 1 Drawing Sheet

FUEL PERMEATION BARRIER FUEL TANK

CROSS-REFERENCE TO RELATED APPLICATION(S)

The present invention claims the priority date of copending U.S. Provisional Patent Application Serial No. 60/172,561, filed Dec. 18, 1999.

TECHNICAL FIELD

The present invention relates generally to fuel tanks for vehicles and, more particularly, to a fuel permeation barrier fuel tank for a vehicle.

BACKGROUND OF THE INVENTION

It is known to provide a fuel tank such as a plastic fuel tank in a vehicle to hold fuel to be used by an engine of the vehicle. Current plastic fuel tanks generally consist of a thin layer of barrier film to block fuel permeation, which is sandwiched between layers of a tough plastic material to provide mechanical strength with an adhesive tie-layer therebetween for integrity of the fuel tank. The current barrier films are best at blocking non-polar liquids like gasoline, but are less effective with polar alcohol containing fuels. In forming the plastic fuel tanks, processes such as blow molding and thermoforming produce plastic fuel tanks having a variable wall thickness. However, there is concern that the variable wall thickness may cause permeation losses through the thinnest areas of the fuel tank and prevent the fuel tank from passing a fuel emissions test.

One commercial approach to resolve this concern is to thicken the tank, which increases the weight, cost and reduces fuel capacity of the fuel tank. Another commercial approach is to include additional layers of different barrier materials in order to broaden resistance to a wider variety of fuels. Yet another commercial approach is to add metal sheets or shields to the fuel tank, which increases the weight and cost of the plastic fuel tank.

Therefore, it is desirable to provide a fuel tank for a vehicle that has a more effective fuel permeation barrier to prevent evaporative emissions. It is also desirable to provide a fuel permeation barrier fuel tank for a vehicle that significantly reduces evaporative emissions and cost of the fuel tank.

SUMMARY OF THE INVENTION

It is, therefore, one object of the present invention to provide a new fuel permeation barrier fuel tank for a vehicle.

It is another object of the present invention to provide a fuel tank that significantly reduces evaporative emissions and cost in comparison to current plastic fuel tanks.

To achieve the foregoing objects, the present invention is a fuel permeation barrier fuel tank for a vehicle including a tank shell having a wall formed from a plurality of layers. The layers include at least an inner layer, an outer layer and a fuel permeation barrier layer disposed between the inner layer and the outer layer, and a thermoformable layer disposed between the fuel permeation barrier layer and the outer layer to improve permeation resistance of the fuel tank.

One advantage of the present invention is that a fuel permeation barrier fuel tank is provided for a vehicle that has a more effective fuel permeation barrier leading to less evaporative emissions. Another advantage of the present invention is that the fuel permeation barrier fuel tank uses a platy layer within a tie-layer as the material for the additional barrier layer, resulting in cost savings of the fuel tank. Yet another advantage of the present invention is that the fuel permeation barrier fuel tank reduces wall thickness, mass, and material needed to reach a specific emission limit. Still another advantage of the present invention is that the fuel permeation barrier fuel tank significantly improves barrier properties and thus lowers cost of the fuel tank.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
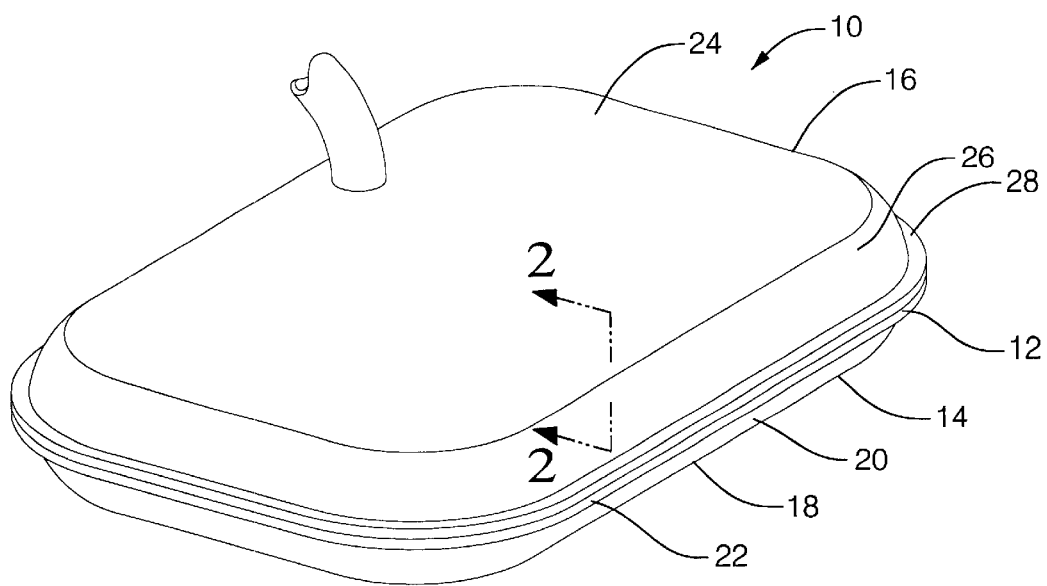
FIG. 1 is a perspective view of a fuel permeation barrier fuel tank, according to the present invention.
Figure 2:
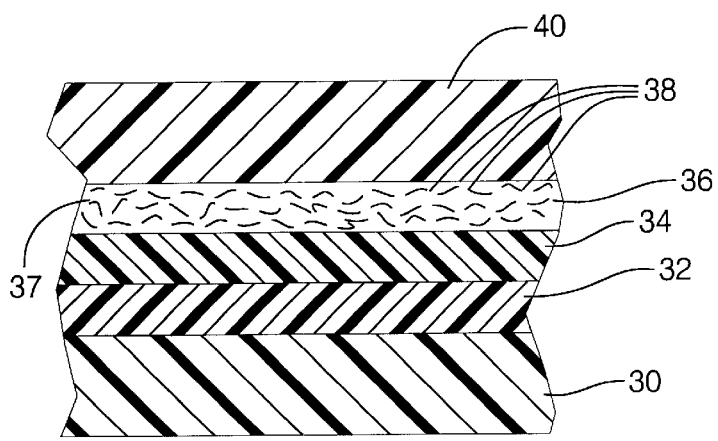
FIG. 2 is an enlarged fragmentary view of a portion of a multi-layer thermoformable sheet used to form the fuel permeation barrier fuel tank of FIG. 1 prior to thermoforming.

Referring to the drawings and in particular FIGS. 1 and 2, one embodiment of a fuel permeation barrier fuel tank 10, according to the present invention, is shown for a vehicle (not shown). The fuel permeation barrier fuel tank 10 includes a tank shell 12. In this embodiment illustrated, the tank shell 12 is of a generally rectangular type. The tank shell 12 includes a first or lower half shell 14 and a second or upper half shell 16. The lower half shell 14 has a base wall 18 and a side wall 20 around a periphery of the base wall 18 and extending generally perpendicular thereto. The side wall 20 has a flange 22 extending outwardly and generally perpendicular thereto. The upper half shell 16 has a base wall 24 and a side wall 26 around a periphery of the base wall 24 and extending generally perpendicular thereto. The side wall 26 has a flange 28 extending outwardly and generally perpendicular thereto. The flanges 22 and 28 of the lower half shell 14 and upper half shell 16, respectively, are joined together to form a seam by suitable means such as by thermoforming, compression molding or friction welding. The lower half shell 14 and upper half shell 16 are made of a rigid material such as a thermoformable plastic.

Referring to FIGS. 1 and 2, the fuel permeation barrier fuel tank 10 has the base walls 18,24, side walls 20,26, and flanges 22,28 are formed from a plurality of layers 30,32, 34,36,38,40. The first or inner layer 30 is made from a thermoformable polymer such as a high-density polyethylene (HDPE) or similar polyolefin, which is a conventional material known in the art. The first layer 30 has a predetermined thickness of approximately two millimeters (2.00 mm).

The second layer 32 is made from an adhesive such as maleated polyethylene (ADMER Grade GT6A), which is a conventional material known in the art. The second layer 32 has a predetermined thickness of approximately 0.1 mm to approximately 1.0 mm.

The third or fuel permeation barrier layer 34 is made from a hydrocarbon barrier material such as an ethylene vinyl alcohol (EVOH) copolymer, which is a conventional material known in the art. The third layer 34 has a predetermined thickness of approximately 0.1 mm to approximately 1.0 mm.

The fourth or thermoformable layer 36 is disposed adjacent the fuel permeation barrier or third layer 34. The thermoformable layer 36 has a thermoformable base polymer or carrier 37, such as a modified polyethylene or polyolefin, containing a filler material 38, such as flaked aluminum or other platy inorganic fillers, dispersed in the carrier 37 and is capable of bonding the layer 36 to the fuel permeation barrier or third layer 34. The carrier 37 has a small quantity from about 0.5 wt. % to about 30 wt. % of the filler material 38 uniformly dispersed therein. The filler material has particles with a high aspect ratio of about five (5) to about one hundred (100) where the thickness is of the order of one micron (1μ). The thermoformable layer 36 has a predetermined thickness of approximately 0.1 mm to approximately 1.0 mm. It should be appreciated that the carrier 37 is capable of being thermoformed, thereby concentrating and coalescing the filler material 38 to produce a fuel tank with improved liquid/vapor barrier properties. It should also be appreciated that the filler material 38 provides resistance to permeation of a wide variety of polar and non-polar organic liquids/vapors. It should further be appreciated that the carrier 37 provides adhesion between the barrier and wall layers.

The fifth or outer layer 40 is made from a thermoformable polymer such as a high-density polyethylene (HDPE) or similar polyolefin, which is a conventional material known in the art. The fifth layer 40 has a predetermined thickness of approximately two millimeters (2.00 mm).

In manufacturing the fuel permeation barrier fuel tank 10, several conventional processes may be used. Preferably, the fuel permeation barrier fuel tank 10 is formed by a conventional thermoforming process wherein the fourth layer 36 can be thermoformed along with the other four layers co-extruded or laminated sheet by heat and pressure. The fourth layer 36 can be included in fuel tanks 10 made by thermoforming and joining the two half shells 14 and 16 made from a thermoformable sheet, when the fuel tank 10 itself is thermoformed from the half shells 14 and 16. In another embodiment, the fuel permeation barrier fuel tank 10 is formed by a conventional extrusion process wherein the fourth layer 36 is extruded as a separate layer that can be incorporated into the multi-layer structure.

Figure 3:
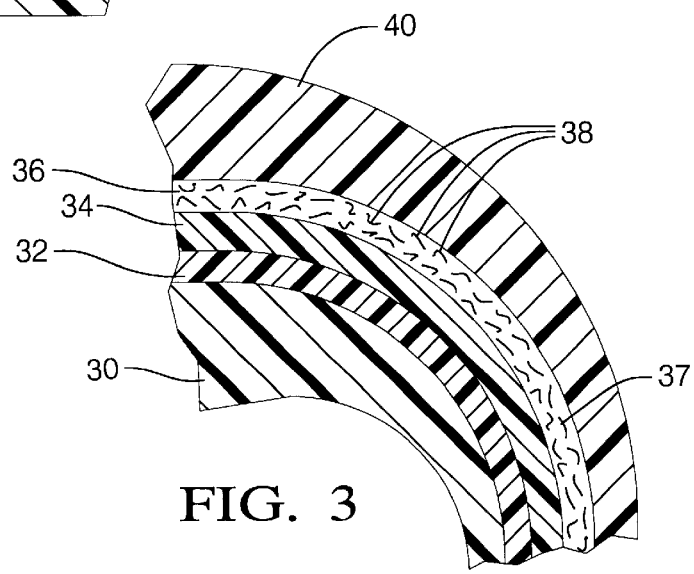
FIG. 3 is an enlarged fragmentary view of a portion of the fuel permeation barrier fuel tank of FIG. 1 after thermoforming.

During thermoforming, the filler material 38 orients, concentrates, and compacts most in areas of high strain, precisely where the walls 18,20,24,26 and fuel permeation barrier layer 34 are thinnest as illustrated in FIG. 3. The filler material 38 is essentially undeformable and impermeable to organic liquids and vapors. The filler material 38 is dispersed in the carrier 37 such that dimensional changes of forming cause the filler material 38 to be orientated parallel to the walls 18,20,24,26 and compacted, especially in areas of high thermoforming strain where the polymeric material is thinnest, thereby increasing permeation protection in those areas where conventional barrier layers are least effective. It should be appreciated that this is especially valuable in plastic fuel tanks because of stringent emission limits for a wide variety of fuel types, including standard gasoline as well as methanol and ethanol augmented fuels. It should also be appreciated that the present invention is not limited to fuel tanks, but could be applied to other thermoformed containers and packaging where barrier properties are needed.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel permeation barrier fuel tank for a vehicle comprising:
   a tank shell having a wall formed from a plurality of layers;
   said layers comprising at least an inner layer, an outer layer, a fuel permeation barrier layer disposed between said inner layer and said outer layer, and a thermoformable layer disposed between said fuel permeation barrier layer and said outer layer to improve permeation resistance of said fuel tank, said thermoformable layer being made of a base polymer and a filler material disposed in said base polymer and being an aluminum flaked material.

2. A fuel permeation barrier fuel tank as set forth in claim 1 wherein said fuel permeation barrier layer is made of hydrocarbon barrier material.

3. A fuel permeation barrier fuel tank as set forth in claim 1 wherein said inner layer and said outer layer are made of a thermoformable polymer material.

4. A fuel permeation barrier fuel tank as set forth in claim 1 wherein said base polymer is either one of a modified polyethylene material and polyolefin material.

5. A fuel permeation barrier fuel tank as set forth in claim 1 wherein said thermoformable layer has a thickness of approximately 0.1 millimeter to approximately 1.0 millimeter.

6. A fuel permeation barrier fuel tank as set forth in claim 1 including an adhesive layer disposed between said inner layer and said fuel permeation barrier layer.

7. A fuel permeation barrier fuel tank as set forth in claim 1 wherein said thermoformable layer has a thickness equal to or less than said fuel permeation barrier layer.

8. A fuel permeation barrier fuel tank as set forth in claim 1 wherein said thermoformable layer has a thickness less than said inner layer and said outer layer.

9. A fuel permeation barrier fuel tank for a vehicle comprising:
   a tank shell having a wall formed from a plurality of layers;
   said layers comprising at least an inner layer, an outer layer, a fuel permeation barrier layer disposed between said inner layer and said outer layer, and a thermoformable layer disposed between said fuel permeation barrier layer and said outer layer to improve permeation resistance of said fuel tank;
   wherein said thermoformable layer is made of a base polymer and a filler material disposed in said base polymer; and
   wherein said filler material is orientated parallel to walls of the fuel tank during thermoforming.

10. A fuel permeation barrier fuel tank for a vehicle comprising:
    a tank shell having a wall formed from a plurality of layers;
    said layers comprising at least an inner layer, an outer layer, a fuel permeation barrier layer disposed between said inner layer and said outer layer, and a thermoformable layer disposed between said fuel permeation barrier layer and said outer layer to improve permeation resistance of said fuel tank; and
    said thermoformable layer comprising a base polymer and a filler material disposed in said base polymer, said filler material being an aluminum flaked material.

11. A fuel permeation barrier fuel tank as set forth in claim 10 wherein said base polymer is either one of a modified polyethylene material and polyolefin material.

12. A fuel permeation barrier fuel tank as set forth in claim 10 wherein said inner layer and said outer layer are made of either one of a polyethylene material and polyolefin material.

13. A fuel permeation barrier fuel tank as set forth in claim 10 wherein said fuel permeation barrier layer is made of a hydrocarbon barrier material.

14. A fuel permeation barrier fuel tank as set forth in claim 10 including an adhesive layer disposed between said inner layer and said fuel permeation barrier layer.

15. A fuel permeation barrier fuel tank as set forth in claim 10 wherein said thermoformable layer has a thickness equal to or less than said fuel permeation barrier layer.

16. A fuel permeation barrier fuel tank for a vehicle comprising:

a tank shell having a wall formed from a plurality of layers;

said layers comprising at least an inner layer, an outer layer, a fuel permeation barrier layer disposed between said inner layer and said outer layer, and a thermoformable layer disposed between said fuel permeation barrier layer and said outer layer to improve permeation resistance of said fuel tank;

said thermoformable layer comprising a base polymer and a filler material disposed in said base polymer; and wherein said filler material is orientated parallel to walls of the fuel tank during thermoforming.

17. A fuel tank for a vehicle comprising:

a tank shell having a wall formed from a plurality of layers;

said layers comprising at least an inner layer and an outer layer comprising either one of a polyethylene material and polyolefin material, a fuel permeation barrier layer disposed between said inner layer and said outer layer, and a thermoformable layer disposed between said fuel permeation barrier layer and said outer layer and comprising a base polymer and a filler material disposed in said base polymer to improve permeation resistance of said fuel tank, wherein said filler material is orientated parallel to walls of the fuel tank during thermoforming.

* * * * *